Oct. 15, 1935.　　　H. M. ROCKWELL　　　2,017,186
ANTIFRICTION BEARING
Filed June 17, 1929
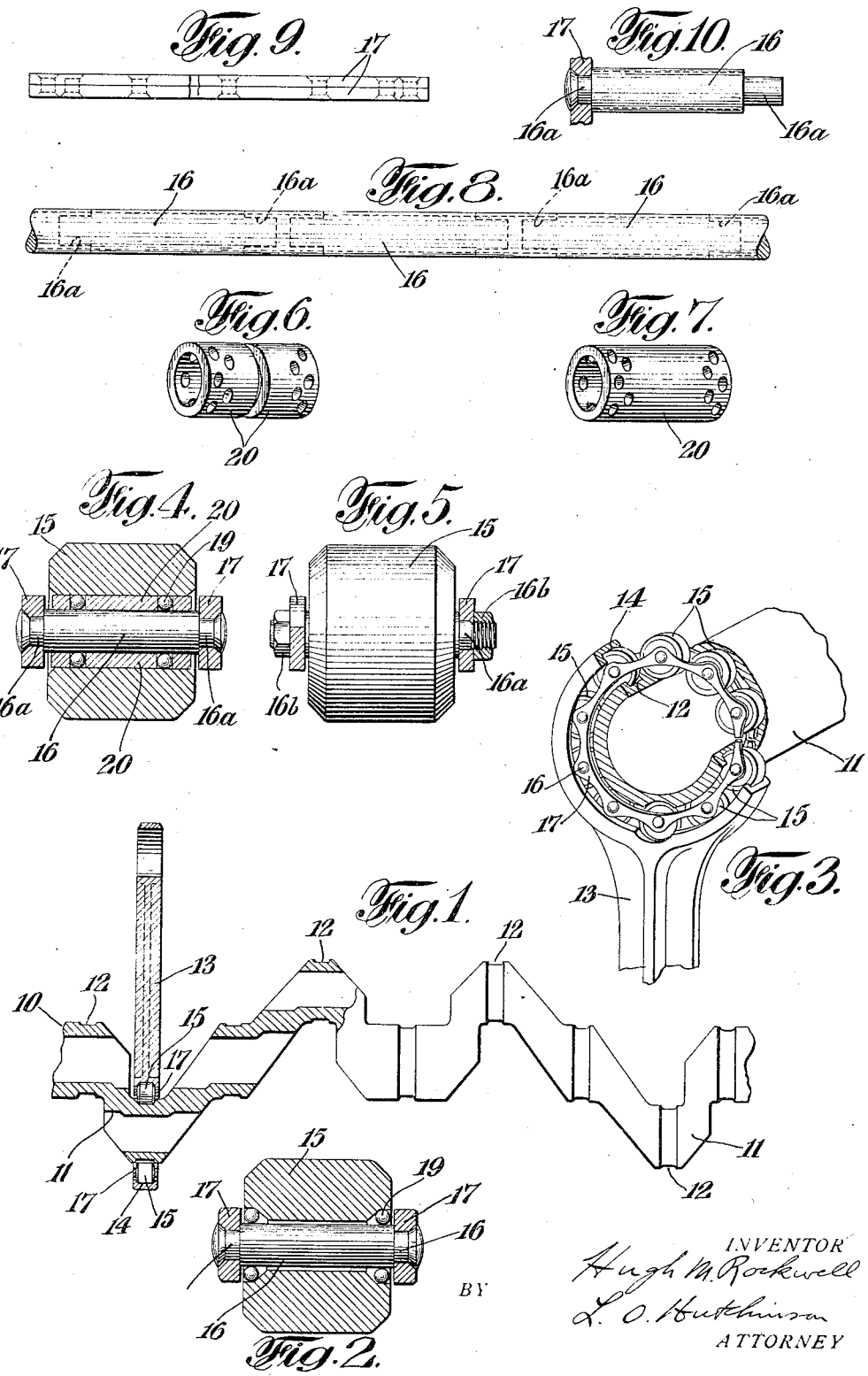

Patented Oct. 15, 1935

2,017,186

UNITED STATES PATENT OFFICE 2,017,186

ANTIFRICTION BEARING

Hugh M. Rockwell, Freeport, N. Y.

Application June 17, 1929, Serial No. 371,674

8 Claims. (Cl. 308—217)

This invention relates to anti-friction bearings and more especially to a bearing suitable for use between the connecting rods and crank shaft of an internal combustion engine or the like or wherever reciprocatory movement is transferred into rotary movement.

Attempts have been made to use anti-friction bearings between the connecting rods and crank pins of an internal combustion engine. These attempts have not been successful because of the peculiar forces to which the anti-friction elements are subjected. Unusual inertia conditions exist whenever an anti-friction bearing is rotated at high speeds about an exterior axis while it is also being rotated about its own axis. The centrifugal force acting on the antifriction rollers tends to force them away from the axis exterior of the bearing. Unless the anti-friction elements are definitely spaced with respect to each other, they will slide under the influence of the centrifugal force each time they make one half a rotation around the exterior axis. The usual type of cage allows some lost motion between the anti-friction element and the cage and the sliding above referred to is equal to this lost motion. With high speed, long stroke crank shafts and heavy anti-friction elements, the sliding action above referred to is very pronounced and results in a quick deterioration of the bearings, due to the wearing effect of the sliding of the anti-friction elements on the raceways.

An object of this invention is an anti-friction bearing suitable for use between crank pins and connecting rods, in which the anti-friction elements are definitely spaced whereby the objectionable sliding action above referred to is overcome.

In a bearing embodying this invention, anti-friction rollers are utilized and are kept in definite spaced relation. The rollers are provided with bores through which extend pins which are rigidly connected at either end to cage rings. Anti-friction balls are located between the pins and the rollers so that friction is reduced to a minimum. Due to the fact that the pins are rigidly held in definite spaced relation by the cage rings and the rollers are held concentric with the pins by the balls lost motion of the rollers is eliminated, thereby preventing the objectionable sliding action.

Other objects, novel features and advantages of this invention will be apparent from the following specification and accompanying drawing, wherein:

Fig. 1 is a fragmentary plan view partly in section of a crank shaft with one connecting rod attached.

Fig. 2 is a section through one form of anti-friction roller.

Fig. 3 is a perspective view partially broken away of a connecting rod and crank pin with the rollers interposed.

Fig. 4 is a vertical section through another type of roller, showing one method of connecting the pins and cage rings.

Fig. 5 is an elevation of the same roller showing a different form of connecting the pins and cage rings.

Figs. 6 and 7 are perspective views of ball spacers.

Fig. 8 discloses the rod from which the pins are formed.

Fig. 9 is an edge view of two cage rings, and

Fig. 10 discloses a pin riveted to one cage ring.

The crank shaft 10 is provided with crank pins 11 which constitute the inner race members of the bearings and in which are provided flat grooves 12 which constitute one set of race ways. Each outer race member comprises a connecting rod 13 having an aperture at its inner end, the enclosing surface of which is provided with a groove 14 or raceway.

The anti-friction elements comprise tubular rollers 15 having recesses in either face, the recesses being joined by a bore of less diameter. Pins 16 of slightly less diameter than the bore of the rollers extend through the same and are provided with reduced end portions 16$^a$ which pass through apertures in the cage rings 17. The cage rings abut the shoulders formed on the pins and are held in spaced relation thereby. In one modification, Fig. 4, the portions 16$^a$ are headed over to rivet together the cage rings and the pins. In another modification, Fig. 5, the portions 16$^a$ are threaded and nuts 16$^b$ hold the cage rings against the shoulders. The rollers 15 are supported from the pins 16 by anti-friction balls 19.

In the modification shown in Fig. 2, the balls are located in the recesses at either end of the roller, in the modification shown in Fig. 4, the bore is of uniform diameter throughout and the balls are located by means of a sleeve 20 in which are provided apertures to receive the balls. A full length sleeve or two half-length sleeves may be used, Figs. 6 and 7, and the balls may lie in straight rows or may be staggered.

With this arrangement, the pins 16 are definitely fixed with respect to each other, and there is no lost motion between the rollers and the cage. It is, therefore, impossible that there should be any sliding action on the part of the rollers. Preferably the rings 17 are split so as to permit compensation for manufacturing errors without imposing a load upon the bearings.

Preferably the pins 16 are formed from a rod such as that shown in Fig. 8 which is carbonized to a slight depth, thereby providing a surface of the requisite hardness to act as a race way for the balls 19. The depth to which the rod is carbonized is indicated in Figs. 8 and 10. In producing the pins from this rod, the latter is turned down at intervals as indicated in dotted lines, thereby forming the reduced portions 16a which have not been hardened. The rod is then cut through between adjacent reduced portions 16a. The reduced portions 16a not having been carbonized are sufficiently malleable that they may be headed over as shown in Figs. 2, 4 and 10 for the purpose of attaching the same to the cage rings. Preferably, the cage rings are bored or reamed in pairs as indicated in Fig. 9 so that the apertures through the same will be definitely in alinement, thereby preventing any strain being interposed between the completed cage and also making it possible to reduce the tolerance to a minimum. The cage rings 17 are also split in pairs, thereby insuring maximum accuracy in the completed cage. The cage structure also insures alinement of the rollers in the race ways since the axes of the pins are held parallel to the axes of the bearing.

I claim:

1. An anti-friction crank throw bearing comprising inner and outer race members, a plurality of tubular rollers interposed between said race members, pins extending through said rollers and having malleable end portions of less diameter than the central portion, said central portion of each pin having a hardened surface, a pair of integral split rings with free ends during the operation thereof coaxial with said race members and having correspondingly arranged apertures through which project end portions of said pins, said end portions being headed over to rivet the rings to said pins, and anti-friction balls interposed between the central portion of each pin and the corresponding roller.

2. An anti-friction crank throw bearing comprising inner and outer race members, a plurality of anti-friction rollers interposed between said race members, said rollers having recesses in each end connected by a bore of smaller diameter, pins extending through said rollers and having malleable end portions of less diameter than the central portion, said central portion of each pin having a hardened surface, a pair of integral split rings with free ends during the operation thereof coaxial with said race members and having correspondingly arranged apertures through which project the end portions of said pins, said end portions being headed over to rivet the rings to said pins, and anti-friction balls interposed between the central portion of each pin and the surface of the recesses of the corresponding roller.

3. An anti-friction crank throw bearing comprising inner and outer race members, a plurality of tubular rollers interposed between said race members, pins extending through said rollers and having malleable end portions of less diameter than the central portion, said central portion of each pin having a hardened surface, a pair of integral split rings coaxial with said race members and having correspondingly arranged apertures through which project the end portions of said pins, said pins being rigidly connected to said rings, and anti-friction balls interposed between the central portion of each pin and the corresponding roller and in contact with the pin.

4. An anti-friction crank throw bearing comprising inner and outer race members, a plurality of anti-friction rollers interposed between said race members, said rollers having recesses in each end connected by a bore of smaller diameter, pins extending through said rollers and having malleable end portions of less diameter than the central portion, said central portion of each pin having a hardened surface, a pair of integral split rings with free ends during the operation thereof having correspondingly arranged apertures through which project the end portions of said pins, said pins connecting said rings in spaced relation, and anti-friction balls interposed between the central portion of each pin and the surfaces of the recesses of the corresponding rollers.

5. An anti-friction crank throw bearing comprising inner and outer race members, a plurality of parallel rollers interposed between said race members, pins journalled in the bores of said rollers, said pins having malleable end portions of less diameter than the central portion and said central portion having a hardened surface, and a pair of integral split rings coaxial with said race members and having correspondingly arranged apertures through which project the end portions of said pins, said end portions being headed over to rivet the rings to said pins.

6. An anti-friction crank throw bearing member comprising inner and outer race members, a plurality of parallel rollers interposed between said race members, pins journalled in the bores of said rollers, said pins having malleable end portions of less diameter than the central portion, said central portion having a hardened surface, and a pair of integral split rings with free ends during the operation thereof coaxial with said race members and having correspondingly arranged apertures through which project the end portions of said pins, said end portions being headed over to rivet the rings to said pins.

7. A bearing construction, comprising a crank shaft, a bearing including a raceway on the crank shaft located away from the center thereof, said bearing having anti-friction elements adapted to have centrifugal forces of alternating directions applied thereto at any given speed, and a split cage comprised of two integral side members with free ends during the operation thereof adapted to eliminate lost motion between said elements and the cage so as to prevent sliding of said elements and thereby prevent uneven wear between the elements and the raceway due to said varying centrifugal forces.

8. A bearing construction, comprising a crank shaft, a bearing on the crank shaft located away from the center thereof, said bearing having anti-friction elements adapted to have varying centrifugal forces applied thereto at any given speed, and a split cage comprised of one integral side member on each side of the bearing with free ends during the operation thereof adapted to eliminate lost motion between said elements and the cage so as to prevent sliding of said elements and thereby prevent uneven wear between the elements and the raceway due to said varying centrifugal forces.

HUGH M. ROCKWELL.